E. ERICKSON.
FASTENING DEVICE.
APPLICATION FILED MAY 12, 1909.
968,036.
Patented Aug. 23, 1910.
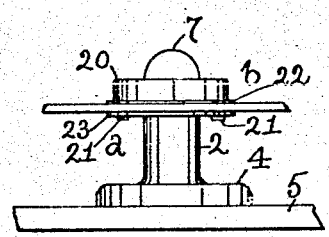
Fig. 1.
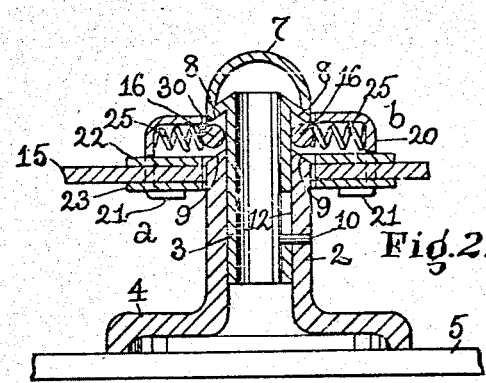
Fig. 2.
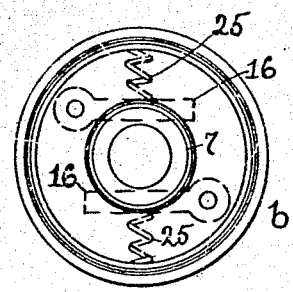
Fig. 4.
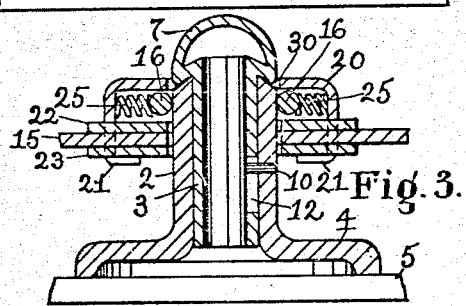
Fig. 3.
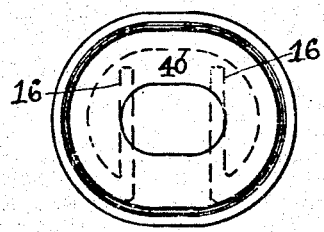
Fig. 5.
Fig. 6.
Witnesses.
C. N. Gannett
J. Murphy
Inventor.
Edward Erickson
by Jas. H. Churchill
Atty.

UNITED STATES PATENT OFFICE.

EDWARD ERICKSON, OF BEVERLY, MASSACHUSETTS.

FASTENING DEVICE.

968,036.  Specification of Letters Patent.  Patented Aug. 23, 1910.

Application filed May 12, 1909. Serial No. 495,473.

*To all whom it may concern:*

Be it known that I, EDWARD ERICKSON, a citizen of the United States, residing in Beverly, county of Essex, and State of Massachusetts, have invented an Improvement in Fastening Devices, of which the following description, in connection with the accompanying drawings, is a specification, like letters on the drawings representing like parts.

This invention relates to a separable button especially designed and adapted among other uses to be employed on automobiles and other vehicles as a fastening device for the curtains, flaps, etc.

The present invention has for its object to provide a simple, inexpensive and efficient button or fastening device, comprising members which are capable of being interlocked so as to securely fasten the members together and which are capable of being readily unlocked and disengaged from each other.

The members of the fastening device or button may be designated the male and female members, the male member in accordance with this invention being composed of two parts, one of which is movable longitudinally with respect to the other, in one direction to permit the female member to be locked in engagement therewith, and which is moved in the opposite direction to permit the disengagement or release of said female member.

These and other features of this invention will be pointed out in the claims at the end of this specification.

Figure 1 is an elevation of a separable button or fastening device embodying this invention in normal position. Fig. 2, a vertical section of Fig. 1 on an enlarged scale. Fig. 3, a like section with the parts of the male member in the position they assume when the female member is to be disengaged therefrom. Fig. 4, a plan of the female member shown in Fig. 1. Figs. 5 and 6, are modifications to be referred to.

Referring to the drawings and especially Figs. 1, 2 and 3, $a$ represents the male member and $b$ the female member of a separable button or fastening device embodying this invention. In the preferred embodiment of the invention, shown in Figs. 1, 2 and 3, the male member $a$ is composed of two parts 2, 3, the part 2 being made as a hollow post or stud having a bottom flange 4, which is designed to be riveted or otherwise fastened to the stationary part 5 of the vehicle, such for instance as the frame of the vehicle top. The part 3 of the male member is composed of a shank portion fitted into and movable longitudinally in the hollow post or stud 2, and a head 7 attached to said shank, said head in the construction shown in Figs. 1, 2 and 3, being made larger than the internal diameter of the hollow stud or post and of substantially the external diameter of the same, and said head is provided with an upwardly and inwardly inclined under surface 8, which coöperates with a correspondingly inclined surface 9 on the outer or upper end of the post or stud 2, for a purpose as will be described. The part 3 is longitudinally movable in the post or stud 2 and provision is made for limiting it in such movement, which may be accomplished as shown in Figs. 2 and 3 by means of a pin or projection 10 on the post 2, which is extended into a slot 12 in the shank 3. The female member $b$, which is fastened to the movable part of the vehicle, such for instance, as a curtain or flap 15 is provided with spring arms 16, which are designed to engage the male member and to be locked thereto as will be described. The spring arms 16, as shown in Fig. 4, are made in the form of levers, pivoted within a shell or casing 20, having prongs or projections 21, which extend through a bottom plate or washer 22 for the said shell or casing and through a second plate or washer 23, between which and the washer 22, the curtain 15 or other fabric or material is secured. The casing or shell 20, the curtain 15, and the washers 22, 23, are provided with suitable holes or openings in them, for the passage of the male member, and the arms 16 are normally projected into the path of the male member by springs 25, which may be soldered or otherwise secured to the shell 20 and arms 16, or which may be simply interposed between the said arms and the shell 20.

In operation with the fastening device shown in Figs. 1, 2 and 3, the parts of the male member are normally in the position shown in Fig. 3, and the female member is disengaged from the male member. When it is desired to secure the curtain 15 to the frame 5, the female member is pressed over the male member with the parts of the latter in the position just described and shown in Fig. 2, with sufficient force to spread the arms 16 apart and carry them beyond the end of the hollow post 2, after which the female member is moved backward or in the reverse direction as if to remove it from the male member, which action causes the part 3 of the male member to be moved longitudinally out of the hollow post until arrested by the pin 10 striking the lower end of the slot 12, by reason of the fact that the upper portions of the arms 16, which are pressed by their springs 25 in frictional engagement with the hollow post 2, engage the head 7 with sufficient friction to carry the said head with the female member until the head 7 is moved away from the end of the post 2 a sufficient distance to form a recess or space of a width which will receive the arms 16, and as soon as this space is formed, the springs 25 force the arms 16 into the same and beneath the head 7, as represented in Fig. 2, so that said arms become interlocked with the head 7, and further backward movement of the female member is prevented by the head 7, which at such time has reached the limit of its outward movement, it being arrested by the pin 10 engaging the bottom wall of the slot 12, as represented in Fig. 2. The two members of the fastening device are thus secured against accidental disengagement. To facilitate the movement of the head 7 away from the end of the hollow post, the outer edge of the head may be beveled slightly to leave a groove or small annular channel 30 around the male member in the closed or normal position of the parts 2, 3, of the same, (see Fig. 3), so that the spring arms 16 may effectively engage the head. While it may be preferred to form the annular groove 30, it may be omitted. The female member remains locked to the male member until positively disengaged therefrom by the operator. To disengage the female member, it is moved longitudinally toward the post 2 so as to engage the arms 16 with the inclined end 9 of the post, and on further movement of the female member, the inclined end 9 acts as a wedge to spread apart the spring arms 16 until the latter engage the exterior surface of the post. The part 3 of the male member is also moved into the hollow post until the head 7 engages the inclined end of the post as represented in Fig. 3, and said head is retained in this position by the operator while the female member is moved backward until the spring arms 16 pass into engagement with the head 7, after which the female member may be withdrawn from engagement with the head. If, however, the pressure is removed from the head 7 before the arms 16 have passed beyond the lower edge of said head, the spring arms 16 will engage the lower edge of the head and separate it from the end of the post, and the arms 16 will be again forced into the space between the end of the post and the head. The disengagement of the spring arms 16 from the underside of the head, may be effected by merely pressing on the head alone, for in this case the spring arms are forced down on the inclined end 9 of the post, which acts to spread the arms apart and while the head 7 is engaged with the post, the female member may be removed as above described.

The engagement and disengagement of the female member with and from the male member may be accomplished by one hand, for to engage the same, it is only necessary to press the female member over the male member, and to disengage the same, the first and second fingers of the hand may be passed under the female member and straddle the hollow post of the male member, while the thumb is pressed upon the head 7 to prevent it being moved with the female member as the latter is forced by the fingers off of the post and over the head until the arms 16 pass the lower edge of the said head.

It may be preferred to make the fastening device like that shown in Figs. 1, 2 and 3, but it is not desired to limit the invention in this respect, as the head 7 may be made of sufficiently small diameter to enter the hollow post, in which case the said head may be connected to the shank 3 by an inwardly inclined portion 32, which is connected by an outwardly inclined portion 33 with the shank 3 (see Fig. 6), the said inclined portions cooperating with diametrically opposite slots or openings 34 in the hollow post, the lower walls of the slots being inclined to register with the inclined portions 33 in the locked position of the female member.

Instead of the construction of spring arms shown in Fig. 4, I may employ that shown in Fig. 5 wherein the said arms are represented as integral with a spring rod 40.

The action of the construction shown in Fig. 6, is substantially the same as that with the construction shown in Figs. 1 and 2, for it will be seen that the inclined walls or surfaces 32, 33 form recesses, which permit the arms 16 to project through the slots 34 in the hollow post 2 and engage the upper walls of the same to lock the female member to the male member. When it is desired to unlock the members of the device, the head 7 is pressed upon to move it longitudinally into the hollow post, which action causes the inclined surfaces 32 to act as cams or wedges and force the spring-actuated arms 16 out of the slots 34 sufficiently far to enable the female member to be readily pulled off of the hollow post or stud 2.

Claims.

1. In a fastening device of the character described, in combination, a male member comprising a hollow post or stud having its upper or outer end inclined, and a shank movable in said hollow post or stud and having a head provided with an inclined under surface coöperating with the inclined surface of the hollow post or stud, means within said hollow post for limiting the movement of said shank in said post, and a female member having an opening through it for the passage of the head of the said shank and provided within it with spring-actuated arms capable of entering the space between the head and the post of the male member to lock the female member to the male member, and to be forced outwardly by longitudinal movement of the head toward the hollow post to permit them to engage the exterior of the hollow post or stud and enable the female member to be disengaged from the male member, substantially as described.

2. In a fastening device of the character described, in combination, a male member comprising a hollow post or stud, a shank movable longitudinally in said hollow post or stud and provided with a head having an inclined surface, means within the hollow post for limiting the movement of said shank in said post, a female member having an opening through it for the passage of the hollow post of the male member and provided with spring-actuated arms to engage the said head to lock the female member to the male member and coöperating with the inclined surface of said head to be expanded by the movement of the said head toward said hollow post to permit the said arms to engage the exterior of said hollow post and enable said arms to be unlocked from the male member, said arms having rounded surfaces which contact with the exterior of the hollow post and with the head to permit the female member to be removed without reëngagement with said head, substantially as described.

3. In a fastening device of the character described, in combination, a male member comprising a hollow part and a part movable longitudinally in said hollow part and having an inclined surface, means within the hollow part for limiting the movement of the part inserted into it, and a female member having an opening through it of larger diameter than the hollow part of said male member, and a spring-actuated device capable of locking engagement with the male member in one position of the parts of said male member, and coöperating with the inclined surface of the longitudinally movable part of said male member to be forced outwardly thereby into position to engage the exterior surface of the hollow part of the male member preparatory to the female member being disengaged from the male member, substantially as described.

4. In a fastening device of the character described, in combination, a male member comprising a hollow post or stud, and a shank movable in said hollow post or stud and having a head provided with an inclined surface, a pin and slot connection between said hollow post or stud and said shank, a female member having an opening through it of a size which permits the female member to be moved longitudinally on said hollow post, and a spring-actuated device carried by said female member and coöperating with the head of said shank member to lock the female member to said male member, and with said inclined surface to be forced outwardly into position to engage the exterior surface of said hollow post to enable the female member to be disengaged from said male member, substantially as described.

In testimony whereof, I have signed my name to this specification in the presence of two subscribing witnesses.

EDWARD ERICKSON.

Witnesses:
 JAS. H. CHURCHILL,
 J. MURPHY.